J. ANTHONY & T. J. PIRRUNG.
WHEEL MOUNTING.
APPLICATION FILED MAR. 7, 1914.
1,116,362.                    Patented Nov. 10, 1914.
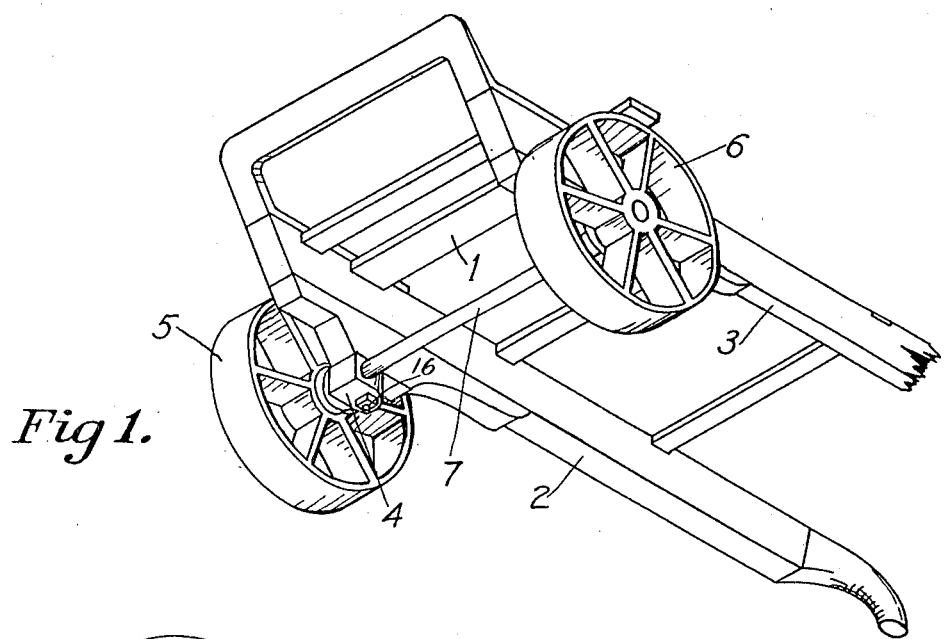
Fig 1.
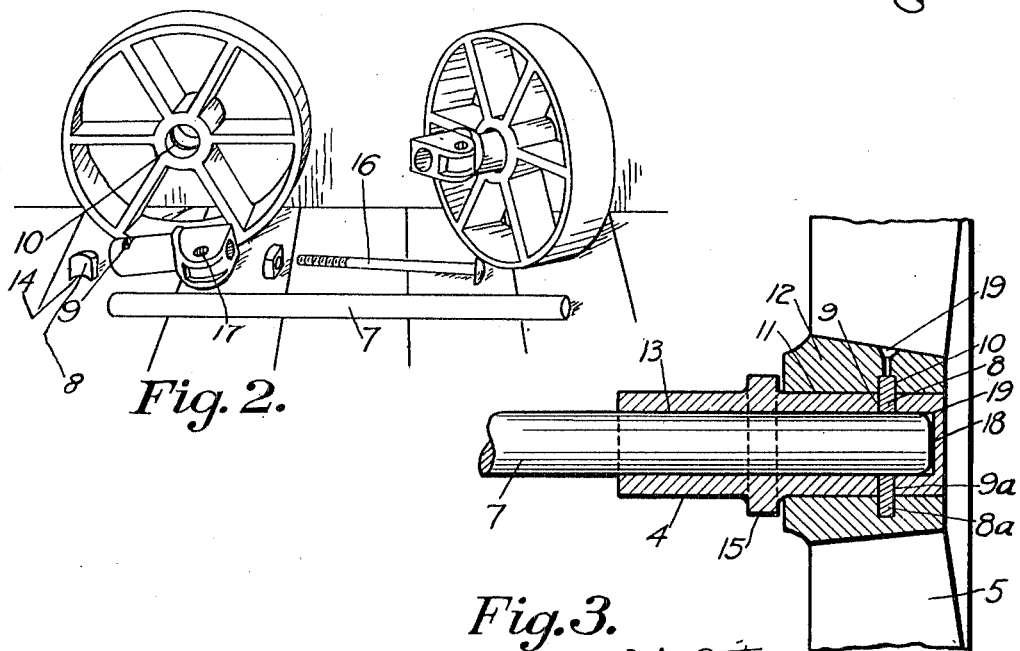
Fig. 2.
Fig. 3.
WITNESSES:
Frederick W. Ives.
James D. Benbow
INVENTORS
John Anthony
Theodore J. Pirrung
BY
Geo. W. Rightmire
ATTORNEY

UNITED STATES PATENT OFFICE.

JOHN ANTHONY AND THEODORE J. PIRRUNG, OF COLUMBUS, OHIO, ASSIGNORS TO THE KILBOURNE & JACOBS MANUFACTURING COMPANY, OF COLUMBUS, OHIO, A CORPORATION OF OHIO.

WHEEL-MOUNTING.

1,116,362.  Specification of Letters Patent.  Patented Nov. 10, 1914.

Application filed March 7, 1914. Serial No. 823,118.

*To all whom it may concern:*

Be it known that we, JOHN ANTHONY and THEODORE J. PIRRUNG, citizens of the United States, residing at Columbus, in the county of Franklin and State of Ohio, have invented certain new and useful Improvements in Wheel-Mountings, of which the following is a specification.

The invention relates to improvements in wheel mountings and consists especially in the provision of an annular groove formed on the inner face of the wheel hub, a sleeve adapted to receive said hub, a positioning device carried by said sleeve and adapted for engagement in said groove, whereby the wheel is positioned against removal upon the sleeve, and a member adapted to be inserted into the sleeve whereby the positioning devices are moved into and held in their proper operative relation with said wheel and sleeve, and means for securing the said sleeve to the body of the vehicle. A wheel mounting is thus provided in which the wheel rotates freely upon the sleeve, and the bar or axle inserted into the sleeve positions the wheel attaching devices and provides against the effect of lateral stresses or strains upon the sleeve, and maintains the proper alinement of the wheels.

In the accompanying drawings, which are hereby made a part of this application, Figure 1 is a perspective of a truck from beneath, showing the parts assembled ready for operation. Fig. 2 shows a pair of wheels in one of which the sleeve is positioned, the groove appearing in the other wheel, the slotted sleeve, a key adapted for positioning therein, which key is adapted to travel in the groove, and the axle or bar which is inserted at its ends into the pair of wheels for the purposes above stated. Fig. 3 is a longitudinal sectional view through the wheel hub and mounting, with the bar in place therein.

Referring to the accompanying drawings, in which the same numeral indicates the same part throughout, 1 is a conventional truck having the side frames 2 and 3, the sleeve 4 being bolted to the frame to fix its position thereon; 5 and 6 are a pair of wheels; 7 is the bar or axle; 8 is a key or positioning device; 9 is a slot formed in the sleeve to receive said key 8, and the groove formed in the hub of the wheel appears at 10. Preferably the sleeve is slotted on the opposite sides thereof as appears in Fig. 3 at 9 and 9ª, and duplicate keys are provided as appears in said Fig. 3 at 8 and 8ª. Although the provision of duplicate parts may not be absolutely necessary, yet smoothness of operation is thereby attained. The groove 10 is annular and is formed on the inner face 11 of the hub 12 as appears especially in Figs. 2 and 3.

The parts are assembled in the following manner: The keys 8, 8ª are placed in the slots 9, 9ª in the sleeve 4. The sleeve is then inserted into the hub 12, and the bar or axle 7 is then introduced through the opening 13 of the sleeve 4 and engages the lower curved faces 14 of the keys, and lifts them into the groove 10 and maintains them in that position as appears especially in Fig. 3. Thereby the wheel is held against longitudinal displacement on the sleeve 4 and the hub 12 abutting at its inner end against the shoulder 15 formed on the sleeve 4, the wheel is by means of said shoulder and the keys operating in the groove held securely in its operating position. The sleeve is then turned to the proper position, and bolt 16 is inserted through the side bar 2 of the truck and the opening 17 in the sleeve, and the sleeve is thereby firmly secured against rotary movement on the frame of the vehicle. The assembling of the outer wheel, keys, and sleeve is then done in the same way, and they are positioned upon the opposite end of the bar or axle 7, and when the sleeve is bolted to the frame of the vehicle the parts are securely positioned for operation. The function of the bar or axle 7 is to lift the keys 8, 8ª into position and maintain them in their engagement with the groove 10, and at the same time prevent the sleeve from being swung on the bolt 16 as on a pivot during the operation of the vehicle, whereby the wheels might be moved out of their proper operating relations. The bar 7 is not an axle in the sense that the wheel rotates thereon; that is, it is not a bearing and has no rotary movement. It is held against endwise movement by engaging at its ends against the cap portion 18 of the sleeve 4, and since the sleeve is bolted onto the sides of the truck the bar 7 is firmly and securely positioned thereby. Preferably the axle at its ends is tapered as appears at 19, so as to take beneath the key and thereby gradually lift said key to its proper position.

When assembled the wheel will rotate freely upon the fixed sleeve 4, and will be held in its proper relation therewith by means of the keys 8, 8ª which are in engagement with the walls of the slots 9, 9ª formed in the sleeve, the keys being positioned and maintained by means of the bar or axle 7, and the wheel therefore will rotate freely upon the sleeve and be securely held thereon. The assembling is a simple matter, and the operating parts are easily replaced when worn. An oil opening may be provided as shown at 19.

What we claim is:

1. A wheel mounting comprising a fixed sleeve bearing having a slot therein, a hub receiving said sleeve and bearing thereon having an annular groove formed on its inner face adapted to register with said slot, a key for engaging said groove and slot to maintain said hub in operative relation with said sleeve, and an axle adapted for insertion in said sleeve whereby said key is lifted into said groove and is thereby maintained therein.

2. In a vehicle a pair of sleeves mounted on opposite sides of the frame thereof having openings therethrough, a wheel mounted on each of said sleeves provided with an annular groove on the inner face of its hub, a key adapted to engage in said groove and said opening, and a bar having its ends positioned in said sleeves, whereby said keys are moved outwardly through said openings into engagement with said grooves, whereby said wheels are held in the proper operative relation with said sleeves, and said sleeves are prevented from swinging laterally out of proper operating position.

In witness whereof we have hereunto subscribed our names at Columbus, Ohio, on this 26th day of February, 1914, in the presence of two witnesses.

JOHN ANTHONY.
THEODORE J. PIRRUNG.

Witnesses:
JAMES D. BENTON,
MARIANNA EDWARDS.

Copies of this patent may be obtained for five cents each, by addressing the "Commissioner of Patents, Washington, D. C."